United States Patent
Bertoli et al.

(10) Patent No.: US 7,441,823 B2
(45) Date of Patent: Oct. 28, 2008

(54) TETHER ROUTING APPARATUS AND METHOD OF USING SAME

(75) Inventors: John K. Bertoli, Columbus, OH (US); Michael D. McCannell, Ottawa (CA); William C. Lanz, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 11/359,050

(22) Filed: Feb. 22, 2006

(65) Prior Publication Data
US 2007/0194590 A1   Aug. 23, 2007

(51) Int. Cl.
*B60N 2/28* (2006.01)

(52) U.S. Cl. ............. 296/68.1; 296/190.08; 297/250.1; 297/468; 280/801.1

(58) Field of Classification Search .......... 296/68.1, 296/190.1, 190.08, 216.11, 250.1, 464, 468; 297/216.11, 250.1, 464, 468; 280/801.1; 403/232.1, 237, 263
See application file for complete search history.

(56) References Cited

U.S. PATENT DOCUMENTS

| | | | | |
|---|---|---|---|---|
| 3,142,264 A | * | 7/1964 | De Boer | 410/106 |
| 3,223,375 A | * | 12/1965 | Bernasconi | 410/101 |
| 3,357,670 A | * | 12/1967 | Larson | 410/106 |
| 4,005,904 A | | 2/1977 | Weman et al. | |
| 5,175,966 A | * | 1/1993 | Remke et al. | 52/163 |
| 6,213,696 B1 | | 4/2001 | Austin | |
| 6,224,129 B1 | | 5/2001 | Cisternino et al. | |
| 6,276,754 B1 | * | 8/2001 | Youssef-Agha et al. | 297/253 |
| 6,422,638 B1 | * | 7/2002 | Carnaghi et al. | 296/146.16 |
| 6,485,055 B1 | | 11/2002 | Swayne et al. | |
| 6,499,786 B2 | | 12/2002 | Takahashi | |
| 6,666,504 B2 | | 12/2003 | Guanzon et al. | |
| 6,729,687 B2 | | 5/2004 | Haverkamp | |
| 6,767,057 B2 | | 7/2004 | Neelis | |
| 6,869,141 B2 | * | 3/2005 | Yamaoka et al. | 297/253 |
| 7,165,809 B2 | * | 1/2007 | Downey | 297/253 |

\* cited by examiner

*Primary Examiner*—Dennis H Pedder
(74) *Attorney, Agent, or Firm*—Mark E. Duell; Fay Sharpe LLP (57) ABSTRACT

A child seat mounting arrangement includes a frame member of a vehicle having an inner surface and an outer surface. A base plate has an engaging surface and an opposite surface. The engaging surface is fixedly secured to the frame member inner surface. A rigid rod is fixedly secured to the base plate opposite surface and extends beyond the frame member such that an engaging portion of the rigid rod is spaced apart from the frame member outer surface and is adapted to receive a tether of a child seat therearound.

21 Claims, 6 Drawing Sheets

TETHER ROUTING APPARATUS AND METHOD OF USING SAME

BACKGROUND

The present invention relates, in general, to child seat mounting arrangements in vehicles. More particularly, the invention relates to a tether routing device employed in a child seat mounting arrangement for directing a tether connected to an upper portion of a child seat to a remotely positioned seat anchor for connection thereto. In one embodiment, the tether routing apparatus is disposed on a vehicle frame adjacent a top portion of a fixed seat back and is thereby used for connecting a tether to the vehicle frame and redirecting the same to a seat anchor disposed near a bottom portion of the vehicle seat back. The tether routing apparatus will be described with particular reference to this embodiment, but it is to be appreciated that the tether routing apparatus is also amenable to like applications.

For safety considerations and/or to comply with vehicle safety regulations (e.g., Federal Motor Vehicle Safety Standards, or FMVSS, 225), manufacturers of child safety seats for vehicles typically include a top tether strap designed to secure a top portion of a child safety seat to a vehicle's body or frame. Additionally, the top tether strap can improve seat stability and reduce the potential for head injury. In conventional passenger vehicles, a child seat is installed in the rear seat of a vehicle and uses the seatbelt or adjacent seat anchors to secure a bottom portion of the child seat. The child seat top tether, which often employs a hook or latch device, is used to secure the top portion of the child seat to an independent anchor provided in the vehicle for this purpose.

In many vehicles, the top tether anchor is disposed adjacent an upper portion of a rear seat back (such as on a vehicle's parcel shelf) or behind the rear seat back adjacent a lower portion thereof with access provided by the seat back being movable or through a cargo area immediately adjacent the rear seat back. Often, the top tether anchor must be remotely positioned relative to the upper portion of the child seat so that the tether can be properly employed by remaining taught after installation. However, in some vehicles, the top tether anchor cannot be provided in either of the aforementioned positions due to the vehicle's configuration. For example, pickup trucks and sport utility vehicles have no rear parcel shelf so the tether anchor cannot be provided thereon. Further, some vehicles (such as a pickup truck) also have no accessible cargo space immediately adjacent the rear seat back. More particularly, in some vehicles, the rear seat back is immediately adjacent a rear cabin wall and any cargo space behind the rear seat is provided beyond this rear cabin wall in a load-carrying bed. Still further, pickup truck type vehicles sometimes employ fixed rear seats adjacent the rear cabin wall (i.e., seats which are not movable, pivotally or otherwise) and therefore no access is available for a top tether anchor disposed behind the rear seat back adjacent a bottom portion thereof.

In instances where the top tether anchor cannot be provided adjacent an upper portion of the rear seat back or behind the rear seat back, a tether routing device may be necessary. Typically, when a tether routing device is employed, it is disposed adjacent an upper portion of the rear seat back. The tether engages and is directed by the tether routing device such that the tether can then extend to a forward lower portion of the rear seat back and be connected to a top tether anchor provided for this purpose. In other words, vehicles employing fixed rear seat backs can meet regulations for child seat tether anchoring by employing a routing device that connects the tether to a top portion of the fixed rear seat back and re-directs the tether toward a top tether anchor which is typically provided in the seat bite between the rear seat back and the lower seating portion upon which a passenger sits.

In one example, the Toyota Tundra employs multiple tether routing devices. These devices include an anchor plate secured to a fixed rear seat portion of the Tundra's vehicle body by a bolt. Either an open-loop or a closed-loop member is sandwiched between the anchor plate and the vehicle body and the loop member is welded to the anchor plate. The bolt connection between the plate and the vehicle body is provided for preventing the loop from separating from the vehicle body. Anti-rotation tabs can be provided on or extending from the anchor plate to cooperatively engage the vehicle body for limiting rotation of the anchor plate relative to the vehicle body.

Difficulties associated with tether routing devices can include the need for a consumer to thread the tether through the tether routing device prior to latching the tether to an appropriate tether anchor. Other difficulties include misuse by consumers or vehicle owners. For example, sometimes attempts are made to latch the top tether directly to the tether routing device. This results in an improper installation which may compromise the safety of the passenger residing in the child safety seat. Still other difficulties include the need for the tether routing device to be fixedly secured to the body structure of the vehicle. In tether routing devices which employ an open loop design, thereby eliminating the need to thread the tether through a closed loop, there is a concern that the tether could inadvertently slide off the tether routing device. Other considerations include the need for a tether routing device that is relatively easy to install in a vehicle during the manufacture of the vehicle.

SUMMARY

In accordance with one aspect, an improved child seat mounting arrangement is provided. More particularly, in accordance with this aspect, the child seat mounting arrangement includes the frame member of a vehicle having an inner surface and an outer surface. A base plate has an engaging surface and an opposite surface. The engaging surface is fixedly secured to the frame member inner surface. A rigid rod is fixedly secured to the base plate opposite surface and extends beyond the frame member such that an engaging portion of the rigid rod is spaced apart from the frame member outer surface and is adapted to receive a tether of a child seat therearound.

In accordance with another aspect, a tether routing apparatus is provided for receiving and routing a tether of a child safety seat secured in a vehicle to a remotely positioned tether anchor. More particularly, in accordance with this aspect, the tether routing apparatus includes a base plate mounted to a frame member of a vehicle. The tether routing apparatus further includes a rigid rod having a mounting portion fixedly secured to a first surface of the base plate and an engaging portion spaced from the base plate for receiving and routing the tether.

In accordance with still another aspect, a child seat mounting arrangement including a tether routing apparatus for receiving and routing a tether of a child safety seat to a tether anchor is provided. More particularly, in accordance with this aspect, the child seat mounting arrangement includes a base plate having an engaging surface mounted to a first surface of a vehicle frame. The engaging surface and the first surface define a first plane therebetween. A rigid rod has an engaging portion and a mounting portion. The mounting portion mounts to a surface of the base plate opposite the engaging surface. The rod extends through the first plane such that the mounting portion is disposed on one side of the first plane and the engaging portion is disposed on another side of the first plane in spaced relation thereto for receiving the tether thereabout.

DETAILED DESCRIPTION

Figure 1:
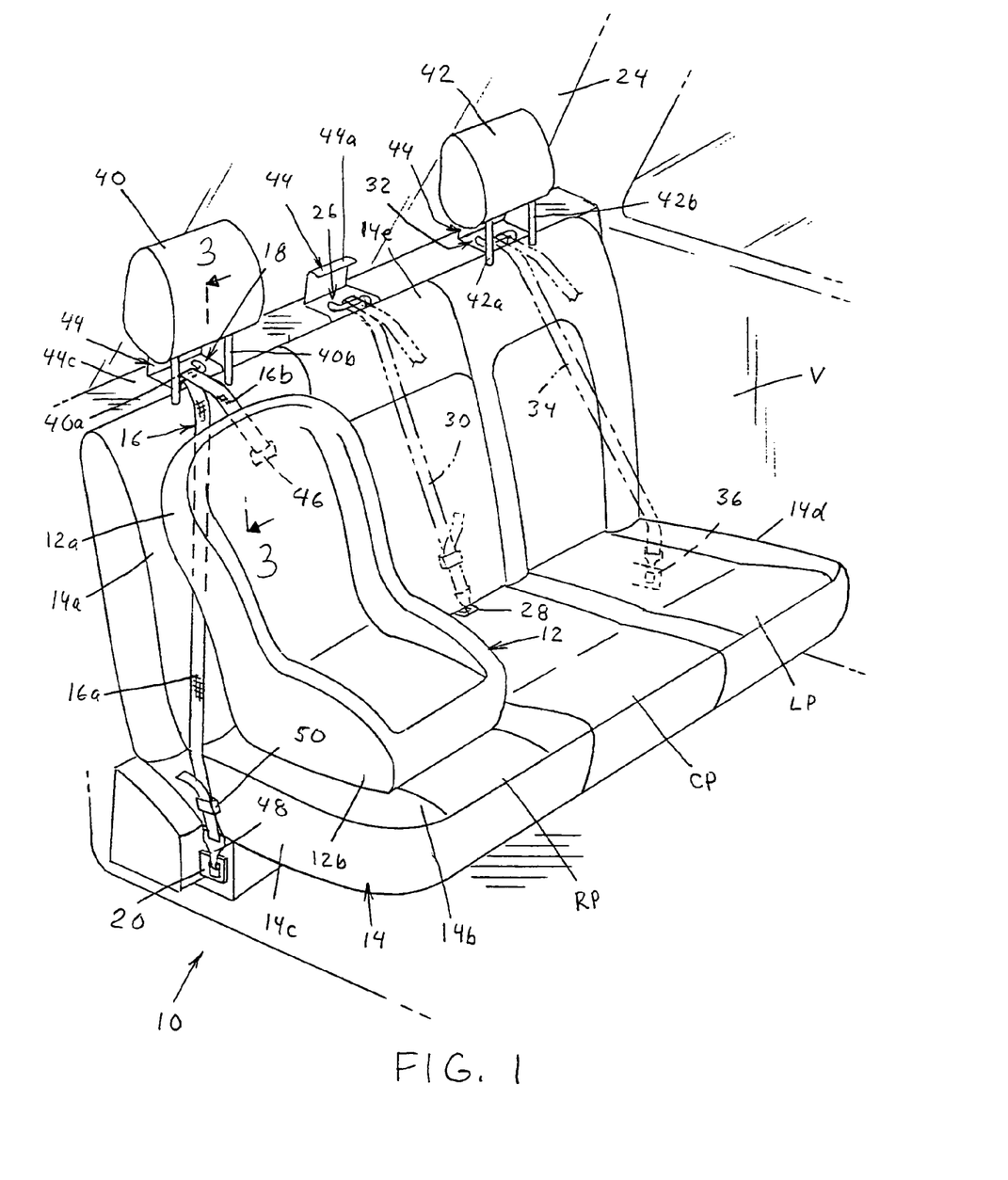
FIG. 1 is a partial perspective view of a child seat secured on a vehicle seat by a top tether passing through a tether routing apparatus and being latched to a top tether seat anchor.
Figure 2:
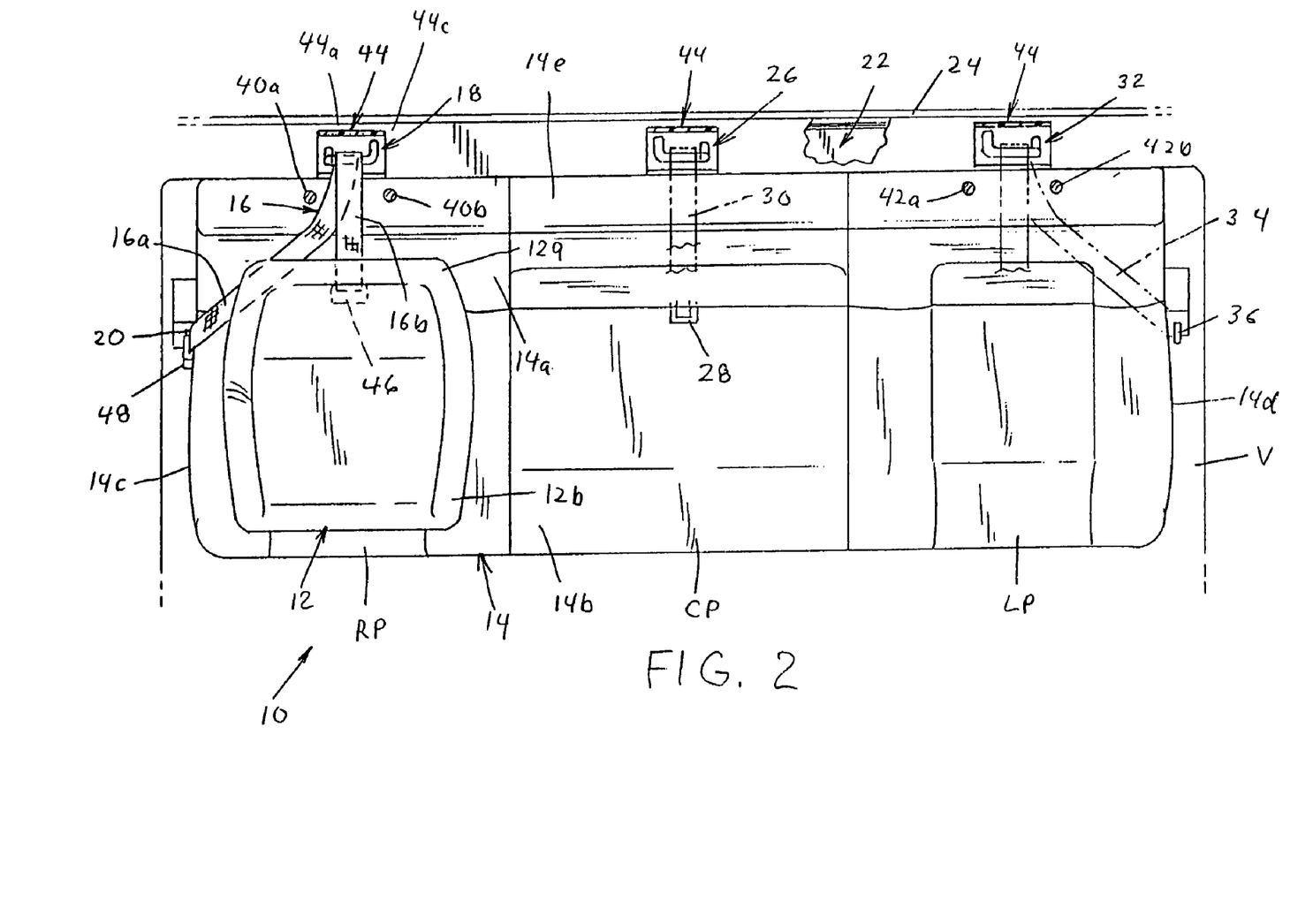
FIG. 2 is a plan view (partially in cross section) of the child seat mounting arrangement depicted in FIG. 1.

Referring now to the drawings wherein the showings are for purposes of illustrating one or more exemplary embodiments, FIG. 1 depicts a child seat mounting arrangement 10 wherein a child seat 12 is secured on a vehicle seat 14. More particularly, with additional reference to FIG. 2, a tether 16 connected to the child seat 12 passes through a tether routing apparatus 18 and extends toward and latches to a tether seat anchor 20. Although not shown, as is generally known and understood by those skilled in the art, child seat 12 is typically further secured to the vehicle seat 14 through separate tethers and associated anchors and/or a seat belt provided for a passenger sitting in the position of the child seat 12. The tether 16, which is secured to the tether anchor 20, secures an upper portion 12a of the child seat to a frame member 22 of the body or frame of vehicle V, as will be described in more detail below.

The vehicle seat 14 includes a seat back or upper portion 14a against which the upper portion 12a of the child seat 12 is secured and further includes a lower or seating portion 14b upon which a passenger sits or, when using a child seat such as child seat 12, upon which a lower portion 12b of the child seat rests. In the illustrated embodiment, the child seat 12 is positioned in the right rear seat position RP of the vehicle V ("right" in reference to the forward direction of the vehicle or the left most position of FIG. 1). The upper seat back portion 14a of vehicle V can be a fixed portion (i.e., nonmovable) which prevents access to a rear side of the upper seat portion 14a, such as may be provided in a pickup or sport utility truck vehicle. In such a vehicle, the frame member 22 extends laterally across vehicle V and forms at least a portion of a rear wall immediately adjacent a rear side of the upper seat portion 14. As is well known, the rear wall can be a wall separating a passenger compartment in which seat 14 is disposed from a load-carrying bed provided rearward of the wall. A rear window 24 can be positioned above and/or supported by the rear wall frame structure 22. Additional seating positions are provided on the seat 14 as is conventionally known. In particular, a left rear seat position LP is provided at an opposite end of the seat 14 from the illustrated child seat 12 and a center position CP is disposed between the left position LP and the right position RP.

In the illustrated embodiment, the tether routing apparatus 18 is disposed on the frame structure 22 at a location adjacent an upper portion of the rear seat back 14A and centrally disposed relative to the rear right seating position RP. The tether routing apparatus 18 functions to receive and route the tether 16 of the seat 12 to the remotely positioned tether anchor 20. Additional tether routing apparatus are disposed at spaced locations along the frame member 22. More particularly, second tether routing apparatus 26 is disposed on the frame member 22 adjacent an upper portion of the rear seat back 14a and centrally disposed relative to center seating position CP. A corresponding second tether anchor 28 is disposed between the seat back 14a and lower seating portion 14b (i.e., the seat bite) for accommodating a tether, such as tether 30 shown in phantom, associated with a child seat residing in the center seating position CP. Similarly, third tether routing apparatus 32 is disposed on the frame member 22 for the left seating position LP and is used with a tether, such as tether 34 shown in phantom connected to third tether anchor 36, to secure a child seat residing in the left seating position LP.

As shown, the tether anchor 20 can be disposed along a side 14c of the seat portion 14b for the right seating position RP. Similarly, tether anchor 36 can be disposed along an opposite side 14d of the lower seat portion 14b for the left seating position LP. Thus, the left and right seating positions LP, RP correspond to tether anchors 20, 36, which are disposed at opposite sides 14c, 14d of the lower seat portion 14b. The seat anchor 28 is provided in the seat bite directly below the tether routing apparatus 26. Where head rests are provided, the tether routing apparatus 18, 24, 28 can be respectively disposed between legs of the head rest. In the illustrated embodiment, head rest 40 is provided for the right rear seating position RP and head rest 42 is provided for the left rear seating position LP. Tether routing apparatus 18 is disposed between head rest legs 40a, 40b and tether routing apparatus 32 is disposed between head rest legs 42a, 42b. In part for aesthetic purposes, cover assemblies 44 can be provided along the frame member 22 for covering the tether routing apparatus 18, 26, 32, particularly when not in use. Each cover assembly 44 can be a plastic component that improves the aesthetic appearance of the tether routing apparatus 18 when mounted in a vehicle and not being used. More particularly, cover 44 can include a movable cover member 44a which in combination with portions 44b, 44c, cooperates to fully enclose the tether mounting apparatus 18.

As illustrated, tether 16 is used to secure upper portion 12a of child seat 12 to seat back portion 14a. More particularly, one end of tether 16 is fixedly connected to child seat upper portion 12a, such as by fixed connection 46. The tether 16 passes through and is routed by the tether routing device 18 toward and/or to the tether seat anchor 20. More particularly, the tether 16 extends from the child seat upper portion 12a (specifically, from fixed connection 46 in the illustrated embodiment) toward the rear seat back 14a (specifically, toward frame member 22 at a location adjacent upper end 14e of upper seat back 14a) whereat the tether routing apparatus 18 is disposed. The tether 16 is rerouted or redirected by the tether routing apparatus 18 in a direction approximately parallel with the seat back portion 14a toward the tether anchor 20. An opposite end of the tether 16 (distal relative to the child seat 12) includes a hook or latch 48 to facilitate latching to the tether anchor 20. As is known and appreciated by those skilled in the art, the tether 16 can further include an adjusting mechanism 50 allowing the length of the tether 16 between the child seat 12 and the anchor 20 to be adjustable.

Figure 3:
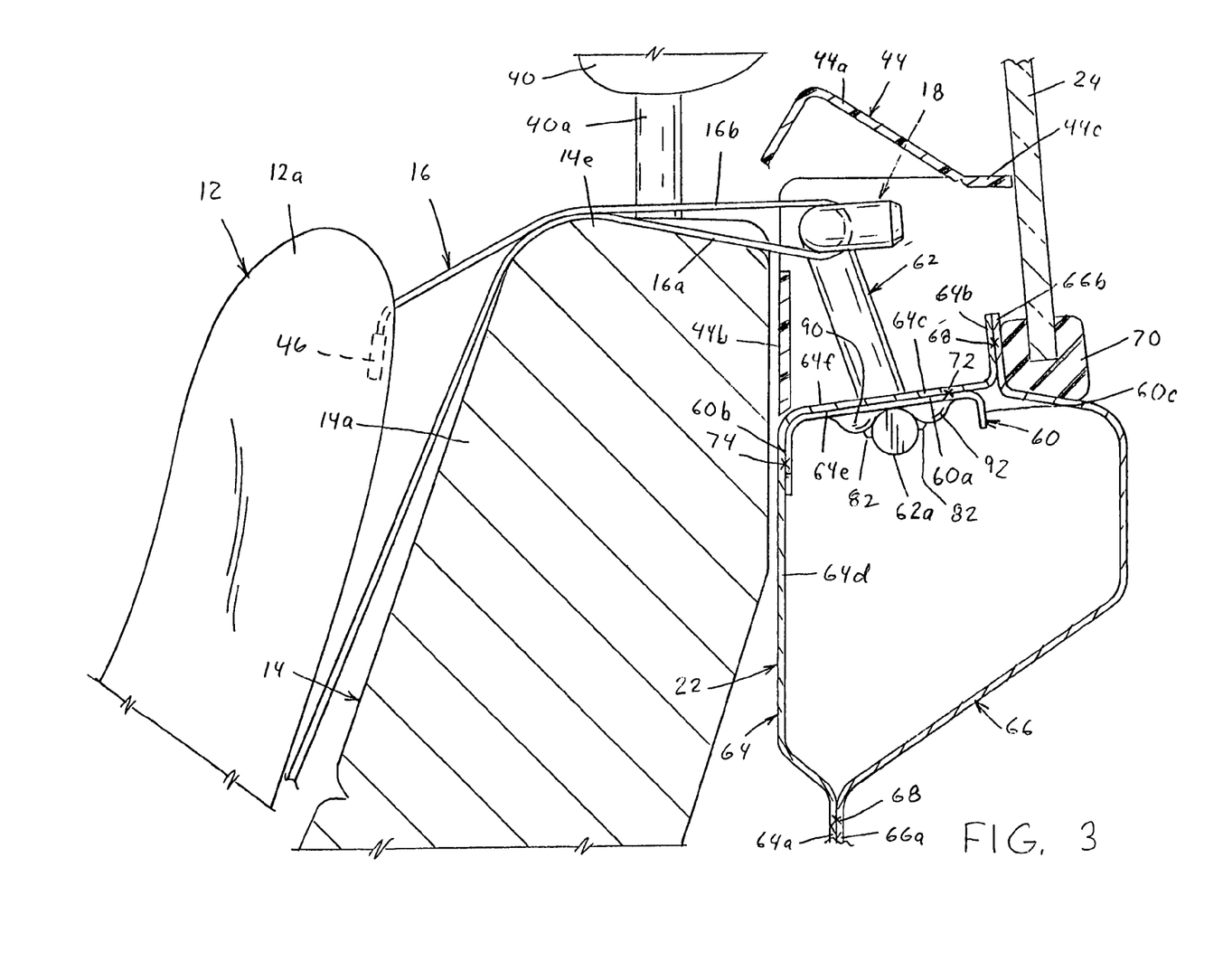
FIG. 3 is a partial cross-sectional view of the child seat mounting arrangement taken along the line 3-3 of FIG. 1 showing a mounting arrangement for the tether routing apparatus.
Figure 4:
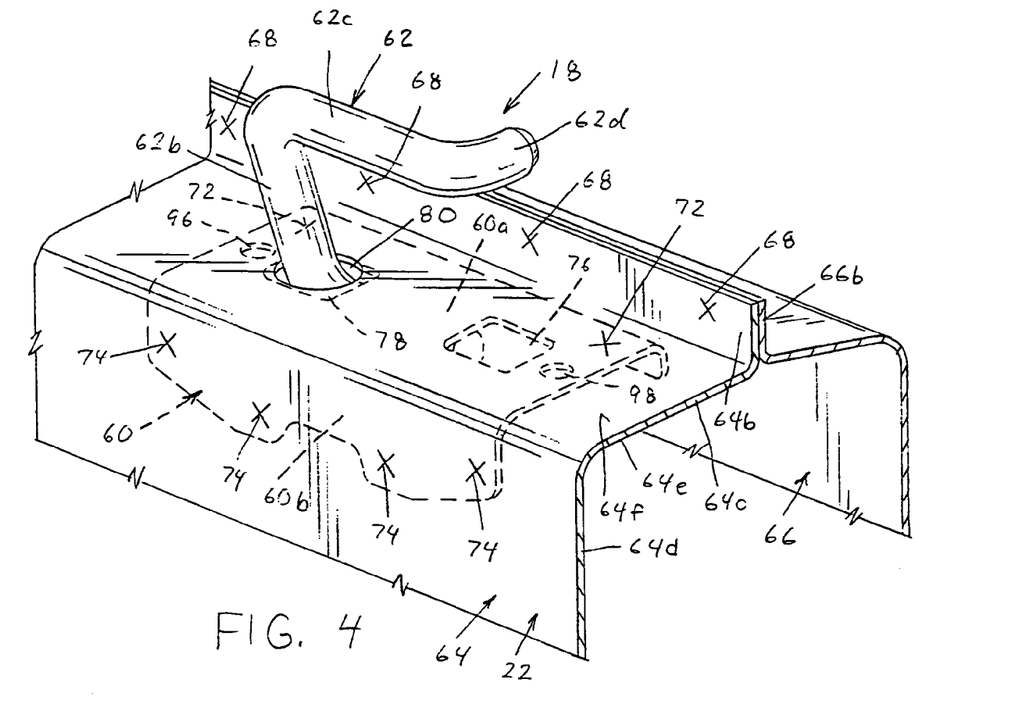
FIG. 4 is a partial perspective view of the tether routing apparatus mounting arrangement of FIG. 3.
Figure 5:
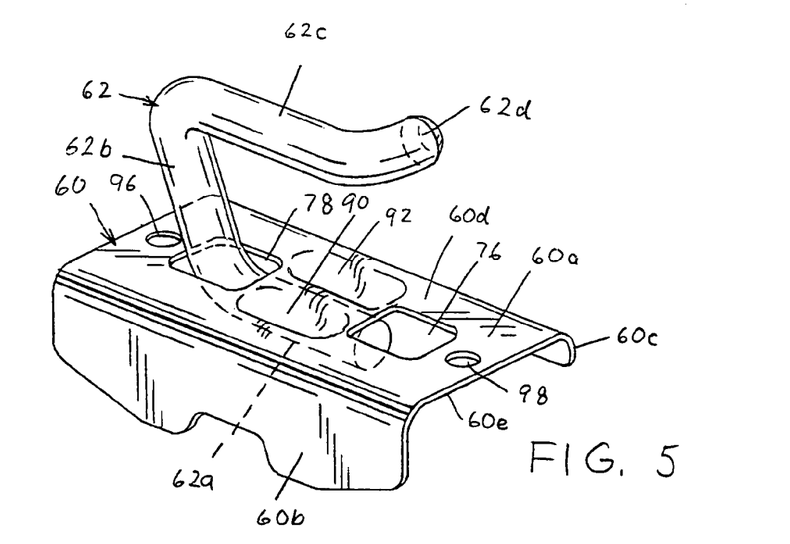
FIG. 5 is a perspective view of the tether routing apparatus of FIG. 3, which includes a base plate and a routing rod fixedly secured to the base plate.
Figure 6:
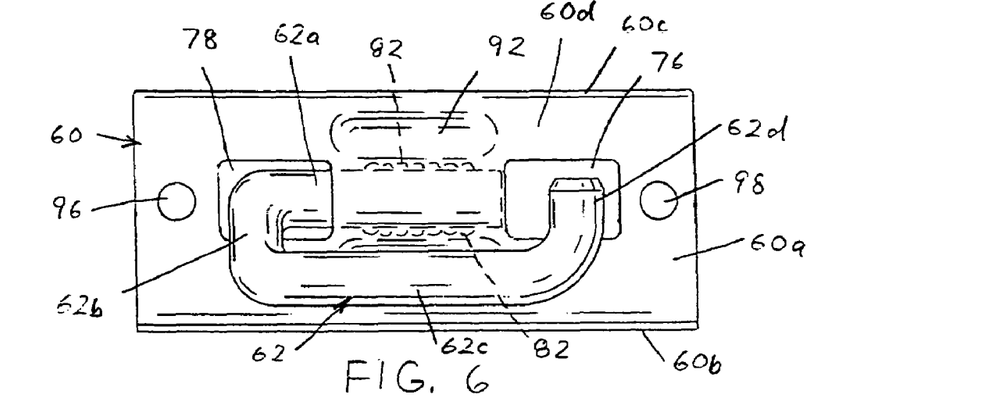
FIG. 6 is a top plan view of the tether routing apparatus of FIG. 3.
Figure 7:
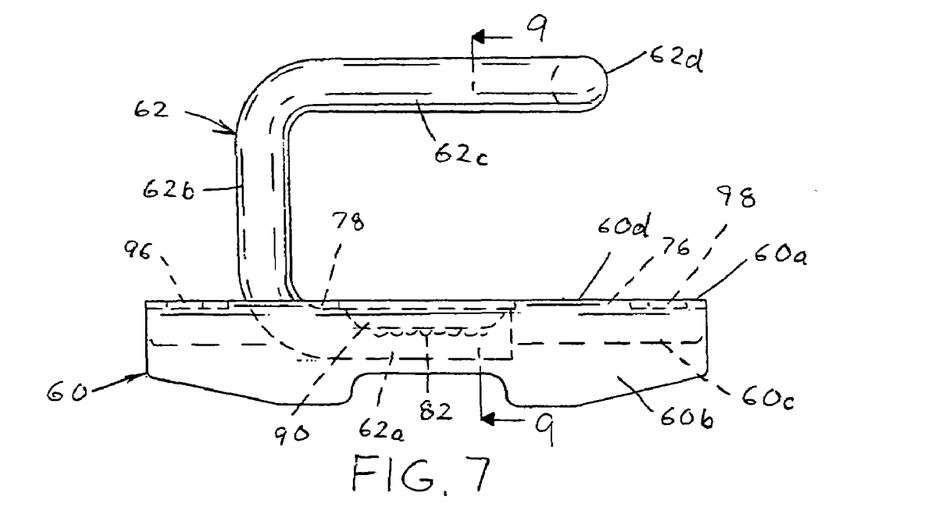
FIG. 7 is a side elevational view of the tether routing apparatus of FIG. 3.
Figure 8:
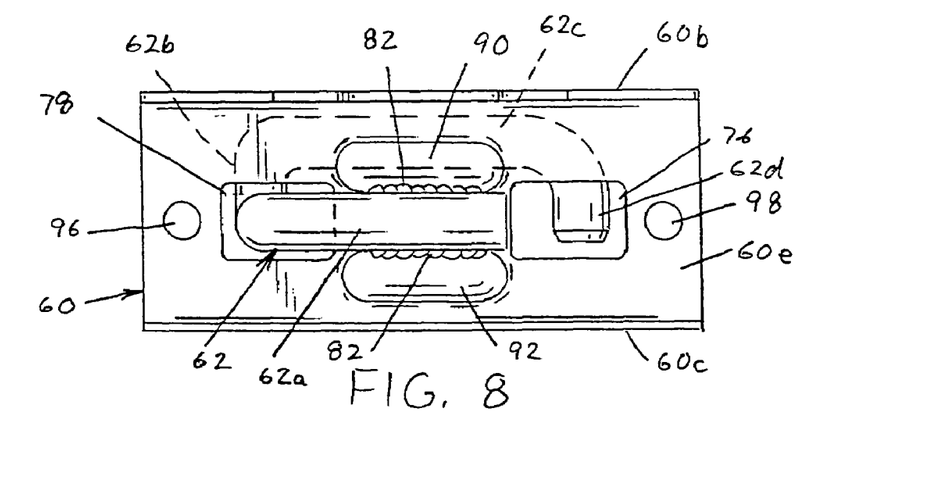
FIG. 8 is a bottom plan view of the tether routing apparatus of FIG. 3.
Figure 9:
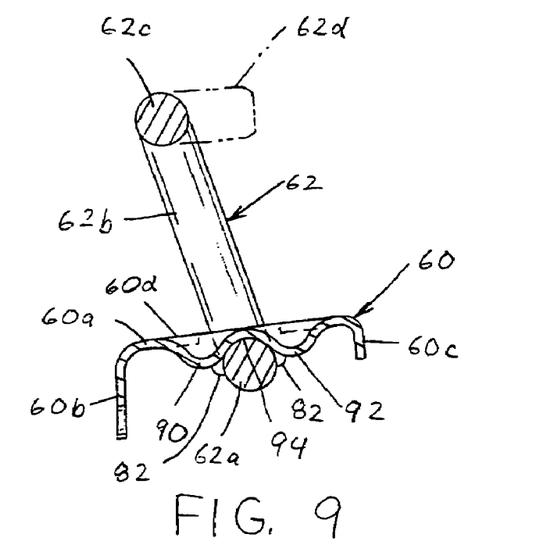
FIG. 9 is a cross-sectional view of the tether routing apparatus taken along the line 9-9 of FIG. 7.

With additional reference to FIGS. 3 and 4, the tether routing apparatus 18, including base plate 60 and a rigid routing rod 62, is fixedly secured to the frame member 22, such as by welding. The tether routing apparatus 18 provides an anchoring device about which the tether passes prior to being securely connected to remotely positioned anchor 20. When tether 16 is properly anchored to anchor 20 such that tether 16 is taught, a holding force is applied to the upper seat portion 12a in the direction of upper seat back portion 14a.

In the illustrated embodiment, frame member 22 can be a hollow structural beam of the vehicle V formed of first stamped sheet frame member 64 and second stamped sheet frame member 66. The stamped sheet frame members 64, 66 can be welded together, such as illustrated at weld locations 68, to form the hollow beam which extends laterally along the upper seat portion 14a. The hollow beam 64, 66 can be the upper end or portion of the rear wall which is disposed immediately behind the fixed seats 14 separating the passenger compartment from the load-carrying bed. Bottom portions 64a, 66a of frame members 64, 66 can together integrally form the rear wall when employed in a pickup or sport utility truck application or, alternatively, frame structure 64, 66 can be otherwise secured to a separate wall structure disposed therebelow. In the illustrated embodiment, rear window 24 is disposed on frame member 66 adjacent seam portions 64b, 66b. As is well known, weather stripping 70 can be provided with the window 24 to hold and/or seal the same relative to the frame structure 64, 66.

With additional reference to FIGS. 5-9, base plate 60, which is mounted to frame member 64, includes first generally planar base portion 60a and has second and third portions 60b, 60c which depend from planar portion 60a along opposite edges thereof. Thus, the depending portions 60b, 60c are angularly disposed relative to the base portion 60a. In the illustrated embodiment, the portions 60b, 60c are approximately normal or perpendicular relative to base portion 60a. The bate plate 60 can be formed as a stamped sheet and thus generally includes a first or engaging surface 60d and a second or opposite surface 60e, also referenced to herein as a rod mounting surface. The frame member 64 includes a first mating portion 64c and a second mating portion 64d, both angularly disposed relative to one another (approximately normal or perpendicular in the illustrated embodiment) and disposed between portions 64a, 64b in the illustrated embodiment Like the base plate 60, the frame member 64 can be formed of a stamped sheet and thus can be further described as having a first inner surface 64e (i.e., the surface disposed within hollow beam 64, 66) and a second outer surface 64f (i.e., the surface disposed outside hollow beam 64, 66). As shown, planar portion 60a can be disposed in abutting relation to frame portion 64c and depending portion 60b of base plate 60 can be disposed in abutting relation to frame portion 64d.

More particularly, in the illustrated embodiment, base portion 60a is mounted against and fixedly secured directly to first mating portion 64c with a first plane defined therebetween. Likewise, second portion 60b is mounted against and fixedly secured directly to second mating portion 64d with a second plane defined therebetween. Like the portions, the first plane is angularly disposed relative to the second plane and, more particularly, the first plane is oriented approximately normal or perpendicular relative to the second plane. Thus, the base plate 60 is secured to the frame member 64 along at least two planes.

As illustrated, the base plate 60 can be welded to the frame member 64 at a plurality of spaced apart locations. More particularly, the base plate engaging surface 60d is fixedly secured to the frame member inner surface 64e via welding with a first plurality of spaced apart weld locations 72 disposed in the first plane between the portions 60a, 64c and a second plurality of spaced apart weld locations 74 disposed in the second plane between the portions 60b, 64d. In this orientation, the engaging surface 60d faces the inner surface 64e.

The base plate 60 can define at least one aperture. In the illustrated embodiment, base plate 60 includes a pair of spaced apart apertures, formed as openings or throughholes 76, 78 in base portion 60a. Though only one of the apertures 76, 78 of base plate 60 is used in conjunction with rod 62, both apertures are provided so a single base plate configuration can be used irrespective of where the tether routing apparatus is positioned in vehicle V. Thus, for example, aperture 76 could be used if base plate 60 were used in association with the left rear seating position LP. The frame member 64 also includes an aperture, opening or throughhole 80, defined through the first mating portion 64c in the illustrated embodiment. The base plate aperture 78 and the frame member aperture 80 are in at least partial registry with one another for receiving the rod 62 therethrough as will be described in more detail below.

As shown, the rod 62 is fixedly secured to the base plate 60, and particularly to the opposite surface 60e on the base portion 60a. In the illustrated embodiment, rod 62 is generally formed as an open loop and includes a mounting portion 62a fixedly secured to the base plate opposite surface 60e, such as by welds 82. The rod 62 further includes an extending portion 62b that passes through apertures 78, 80 enabling rod 62 to extend beyond the frame member 64 such that an engaging portion 62c of the rod is spaced apart from the frame member outer surface 64f and the base plate 60 and is thereby adapted to receive the tether 16 therearound. In the illustrated embodiment, the rod mounting portion 62a and the rod engaging portion 62c extend axially in generally parallel relation to the frame member outer surface, and particularly to a longitudinal direction of the frame outer surface 64f (i.e., the lateral direction of the vehicle). The engaging portion 62c generally faces the frame member outer surface 64f. The extending portion 62b, disposed between the mounting portion 62a and engaging portion 62c, extends upwardly from the mounting portion 62a such that the portions 62a, 62c are offset from one another (best illustrated in FIG. 6). Together, the rod portions 62a, 62b, 62c give the rod 62 a generally U-shaped with mounting portion 62a forming a first side of the U-shape, the engaging portion 62c forming a second, opposite side of the U-shape and the engaging portion forming a base side of the U-shape opposite an open end adapted or suitable for receiving tether 16 therein.

The planar portion 60a of the base plate 60 can include embossments or embossed areas 90, 92, which can be spaced from one another as shown. Embossed areas 90, 92 define a recess or seating area 94 therebetween for receiving the mounting portion 62a of rod 62. More particularly, rod 62 has its mounting portion 62a disposed in seating area 94 also referred to herein as a recessed area, between embossed areas 90, 92 which, as described above, can be welded to the base plate 60 to fixedly secure the rod 62 to the base plate 60. The embossed areas 90, 92 prevent relative movement between the rod 62 and the base plate 60, at least in the forward and rearward directions (i.e., longitudinal direction) of the vehicle V.

From the mounting portion 62a being received in the recess 94, the extending portion 62b of the rod 62 passes through a apertures 78,80 such that the rod 62 extends through the first plane upwardly from the base plate 60. More particularly, the mounting portion 62a is disposed on one side of the first plane (inside hollow beam 64, 66 in the illustrated embodiment) and the engaging portion 62c is disposed on another side (i.e., the opposite side) of the first plane in spaced relation thereto. As already described, the tether engaging portion 62c is that which engages and redirects the tether 16 when the tether is routed thereby.

In this configuration, the tether 16 can be received around the rod engaging portion 62c such that tether portions 16a, 16b extend in a first direction (i.e., toward a forward portion of vehicle V). The rod 62 can further include an end or retaining portion 62d extending from an end of engaging portion 62c opposite the extending portion 62b and distal relative to the base plate 60. As shown, the retaining portion 62d can extend in a direction generally opposite that of the tether 16, such as a second direction opposite the first direction (i.e., toward a rear portion of vehicle V). The distal end portion 62d eliminates or at least reduces the likelihood that the tether 16 will inadvertently slide off the rod 62 when anchoring a child seat 12. Guiding apertures 96, 98 can be provided in the planar portion 60a of the base plate 60 for purposes of aligning the guide plate 60 relative to the frame member 64 during manufacture of the vehicle V.

Figure 10:
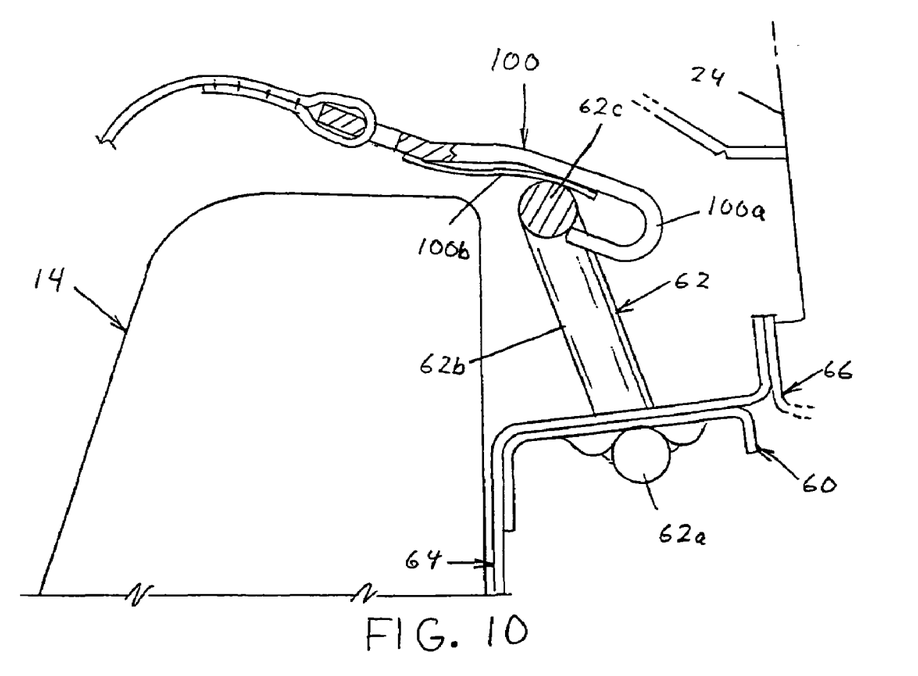
FIG. 10 is a partial cross-sectional view of a child seat mounting arrangement employing the tether routing apparatus of FIG. 3 showing that a conventional child seat anchor is prevented from being latched to the tether routing apparatus.

With reference to FIG. 10, the diameter of the rod 62, or at least of the tether engaging portion 62c of the rod, is sufficiently large such that a conventional child seat latching device 100, such as those typically found at the end of tethers, cannot be used to latch the tether to the tether routing apparatus. More particularly, the hooked portion 100a of the latch 100 has a diameter that is smaller than the tether engaging portion 62c so that it cannot receive the tether engaging portion 62c therein and movable locking member 100b will not be able to lock tether engaging portion 62c therein. In one embodiment, the diameter of the engaging portion 62c is 12 mm.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A child seat tether routing apparatus, comprising:
a frame member of a vehicle having an inner surface and an outer surface;
a base plate having an engaging surface and an opposite surface, said engaging surface fixedly secured to said frame member inner surface; and
a rigid rod fixedly secured to said base plate opposite surface and extending beyond said frame member such that an engaging portion of said rigid rod is spaced apart from said frame member outer surface, said rod generally formed as an open loop including a mounting portion secured to said base plate opposite surface, said engaging portion axially extending in generally parallel relation to said frame member outer surface and an extending portion disposed between said mounting portion and said engaging portion, an open side of said open loop opposite said extending portion receives a tether of a child seat, said rod further includes a retaining portion extending from an end of said engaging portion opposite said extending portion, said retaining portion extending in a substantial longitudinal direction of the vehicle, said tether wraps around said engaging portion so as to reverse direction.

2. The child seat mounting arrangement of claim 1 wherein said base plate and said frame member each define apertures in at least partial registry with one another which receive said extending portion of said rigid rod therethrough.

3. The child seat mounting arrangement of claim 1 wherein said frame member forms a rear wall separating a passenger compartment from a load-carrying bed.

4. The child seat mounting arrangement of claim 3 wherein said frame member is a hollow beam forming an upper portion of said rear wall, said frame member inner surface disposed inside said hollow beam and said frame member outer surface disposed outside said hollow beam.

5. The child seat mounting arrangement of claim 3 wherein said rear wall is disposed adjacent fixed rear seats of said passenger compartment.

6. The child seat mounting arrangement of claim 1 wherein said base plate is welded to said frame member at a plurality of spaced apart locations.

7. The child seat mounting arrangement of claim 6 wherein said frame member includes a first mating portion and a second mating portion angularly disposed relative to said first mating portion, said base plate includes a base plate first portion in abutting relation to said first mating portion and a baseplate second portion in abutting relation to said second mating portion.

8. The child seat mounting arrangement of claim 7 wherein said first mating portion is angularly disposed in approximately normal relation to said second mating portion.

9. The child seat mounting arrangement of claim 7 wherein said inner surface and said engaging surface are welded together at a first plurality of spaced locations between the base plate first portion and the first mating portion and at a second plurality of spaced locations between the base plate second portion and the second mating portion.

10. The child seat mounting arrangement of claim 1 wherein said base plate includes spaced apart embossments defining a recess that receives a mounting portion of said rigid rod which is welded to said base plate to fixedly secure said rod to said base plate, said rigid rod nestably received in said recess between said embossments.

11. A tether routing apparatus for receiving and routing a tether of a child safety seat secured in a vehicle to a remotely positioned tether anchor, the tether routing apparatus comprising:
a base plate mounted to a frame member of a vehicle; and
a rigid rod having a mounting portion fixedly secured to a rod mounting surface of said base plate and an engaging portion spaced from said base plate that receives and reroutes the tether to the remotely positioned tether anchor, wherein said rod has a U-shape including said mounting portion forming a first side of said U-shape, said engaging portion forming a second, opposite side of said U-shape and an extending portion disposed between said mounting portion and said engaging portion forms a base side of said U-shape, wherein an open end of said U-shape receives said tether therein, said engaging portion having said tether wrapped therearound so as to direct the tether to the anchor, which is forwardly disposed along with the child safety seat relative to said rigid rod, wherein said tether is received around said engaging portion such that two portions of said tether extend in a first direction, said rod includes an end portion distal relative to said base plate that extends from said engaging portion in a substantially longitudinal direction of the vehicle.

12. The tether routing apparatus of claim 11 wherein said base plate has a first base portion and a second base portion, said frame member has a first mating portion and a second mating portion, said first base portion is mounted against and fixedly secured directly to said first mating portion with a first plane defined therebetween, said second base portion is mounted against and fixedly secured directly to said second mating portion with a second plane defined therebetween that is angularly disposed relative to said first plane.

13. The tether routing apparatus of claim 12 wherein said base plate is welded to said frame member at locations disposed in both said first plane and said second plane.

14. The tether routing apparatus of claim 11 wherein said base plate defines an aperture and said rigid rod includes an extending portion passing through said aperture and disposed between said mounting portion and said engaging portion, said engaging portion generally parallel to an engaging surface of said base plate which faces said engaging portion.

15. The tether routing apparatus of claim 14 wherein said frame member includes a frame member aperture at least partially in registry with said base plate aperture such that said base plate engaging surface is mounted to a frame member first surface facing said base plate engaging surface and said engaging portion faces a frame member second surface opposite said frame member first surface.

16. The tether routing apparatus of claim 11 wherein said rod has a diameter that prevents said rod from being received in a child seat tether latching device.

17. The tether routing apparatus of claim 14 wherein said diameter is 12 mm and is disposed along at least said engaging portion.

18. The tether routing apparatus of claim 11 wherein said mounting portion is received in a recessed area of said base plate formed between a pair of spaced embossments.

19. A child seat mounting arrangement, comprising:
a tether routing apparatus, comprising:
a base plate having an engaging surface mounted to a first mating surface of a vehicle frame member, said vehicle frame member disposed rearwardly relative to a seat back of fixed rear seats of a passenger compartment, said engaging surface and said first mating surface defining a first plane therebetween, and
a rigid rod having an engaging portion and a mounting portion, said mounting portion mounted to a surface of said base plate opposite said engaging surface, said rod extending through said first plane such that said mounting portion is disposed on one side of said first plane and said engaging portion is disposed on another side of said first plane in spaced relation relative thereto that receives a tether of a child safety seat wrapped thereabout and redirects the tether originating from a front side of the seat back of the fixed rear seats, said rod further includes a retaining portion extending from a distal end of said engaging portion in a direction away from the seat back of the fixed rear seats; and
a tether anchor remotely positioned relative to said tether routing apparatus and disposed forward of the seat back of the fixed rear seats, the tether being routed by said tether routing apparatus to said tether anchor and being fixedly secured by a latch to said tether anchor.

20. The child seat mounting arrangement of claim 19 wherein said tether routing apparatus is positioned adjacent an upper end of a seat back of a rear vehicle seat and said tether anchor is positioned adjacent a lower seat portion of said rear vehicle seat.

21. The child seat mounting arrangement of claim 19 wherein the tether is wrapped around nearly 180 degrees of said engaging portion.

* * * * *